United States Patent

Han et al.

[11] Patent Number: 6,134,955
[45] Date of Patent: *Oct. 24, 2000

[54] MAGNETIC MODULATION OF FORCE SENSOR FOR AC DETECTION IN AN ATOMIC FORCE MICROSCOPE

[75] Inventors: Wenhai Han, Tempe; Stuart M. Lindsay, Phoenix; Tianwei Jing, Tempe, all of Ariz.

[73] Assignees: Molecular Imaging Corporation, Phoenix; Arizona Board of Regents, Tempe, both of Ariz.

[*] Notice: This patent is subject to a terminal disclaimer.

[21] Appl. No.: 09/228,226

[22] Filed: Jan. 11, 1999

Related U.S. Application Data

[63] Continuation of application No. 08/710,191, Sep. 12, 1996, Pat. No. 5,866,805, which is a continuation-in-part of application No. 08/553,111, Nov. 7, 1995, Pat. No. 5,612,491, which is a division of application No. 08/403,238, Mar. 10, 1995, Pat. No. 5,513,518, which is a continuation of application No. 08/246,035, May 19, 1994, Pat. No. 5,515,719.

[51] Int. Cl.⁷ .................................................... G01B 5/28
[52] U.S. Cl. ............................................. 73/105; 250/306
[58] Field of Search ............................ 73/105; 250/306

[56] References Cited

U.S. PATENT DOCUMENTS

| | | |
|---|---|---|
| Re. 33,387 | 10/1990 | Binnig . |
| Re. 34,331 | 8/1993 | Elings et al. . |
| Re. 34,489 | 12/1993 | Hansma et al. . |
| 4,343,993 | 8/1982 | Binnig et al. . |
| 4,422,002 | 12/1983 | Binnig et al. . |
| 4,520,570 | 6/1985 | Bednorz et al. . |
| 4,668,865 | 5/1987 | Gimzewski et al. . |
| 4,724,318 | 2/1988 | Binnig . |
| 4,785,177 | 11/1988 | Beocke . |
| 4,800,274 | 1/1989 | Hansma et al. . |
| 4,806,755 | 2/1989 | Duerig et al. . |
| 4,823,004 | 4/1989 | Kaiser et al. . |
| 4,837,435 | 6/1989 | Sakuhara et al. . |
| 4,866,271 | 9/1989 | Ono et al. . |
| 4,868,396 | 9/1989 | Lindsay . |
| 4,871,938 | 10/1989 | Elings et al. . |
| 4,877,957 | 10/1989 | Okada et al. . |
| 4,883,959 | 11/1989 | Hosoki et al. ............................ 250/306 |
| 4,889,988 | 12/1989 | Elings et al. . |

(List continued on next page.)

FOREIGN PATENT DOCUMENTS

| | | |
|---|---|---|
| 63-85461 | 4/1988 | Japan . |
| 5-203626 | 8/1993 | Japan . |
| 6-59004 | 3/1994 | Japan . |
| 2009409 | 6/1979 | United Kingdom ..................... 73/105 |

OTHER PUBLICATIONS

Jung, P.S., et al., "Novel Stationary–Sample Atomic Force Microscope with Beam–Tracking Lens", Electronics Letters, Feb. 4, 1993, vol. 29, No. 3, pp. 264–265.

(List continued on next page.)

*Primary Examiner*—Daniel S. Larkin
*Attorney, Agent, or Firm*—Killworth, Gottman, Hagan & Schaeff, LLP

[57] ABSTRACT

A scanning probe microscope for generating a signal corresponding to the surface characteristics of a scanned sample is provided and includes a force sensing probe tip disposed on a first side of a free end of a flexible cantilever which is adapted to be brought into close proximity to a sample surface; a magnetized material disposed on a second side opposite the first side of the flexible cantilever; an XY scanner for generating relative scanning movement between the force sensing probe tip and the sample surface; a Z control for adjusting the distance between the force sensing probe tip and the sample surface; and a deflection detector for generating a deflection signal indicative of deflection of the flexible cantilever. The scanning probe microscope also includes an ac signal source and a magnetic field generator for generating a magnetic field, with the magnetic field generator being coupled to the ac signal source so as to modulate the magnetic field with the ac signal. The force-sensing cantilever is magnetized with a moment along the soft axis of the cantilever.

9 Claims, 3 Drawing Sheets

U.S. PATENT DOCUMENTS

| | | |
|---|---|---|
| 4,902,892 | 2/1990 | Okayama et al. . |
| 4,914,293 | 4/1990 | Hayashi et al. . |
| 4,924,091 | 5/1990 | Hansma et al. . |
| 4,935,634 | 6/1990 | Hansma et al. . |
| 4,947,042 | 8/1990 | Nishioka et al. . |
| 4,952,857 | 8/1990 | West et al. . |
| 4,954,704 | 9/1990 | Elings et al. . |
| 4,956,817 | 9/1990 | West et al. . |
| 4,962,480 | 10/1990 | Ooumi et al. . |
| 4,968,390 | 11/1990 | Bard et al. . |
| 4,968,914 | 11/1990 | West et al. . |
| 4,969,978 | 11/1990 | Tomita et al. . |
| 4,992,659 | 2/1991 | Abraham et al. . |
| 4,992,728 | 2/1991 | McCord et al. . |
| 4,999,494 | 3/1991 | Elings . |
| 4,999,495 | 3/1991 | Miyata et al. . |
| 5,003,815 | 4/1991 | Martin et al. . |
| 5,009,111 | 4/1991 | West et al. . |
| 5,017,010 | 5/1991 | Mamin et al. . |
| 5,018,865 | 5/1991 | Ferrell et al. . |
| 5,025,658 | 6/1991 | Elings et al. . |
| 5,047,633 | 9/1991 | Finlan et al. . |
| 5,051,646 | 9/1991 | Elings et al. . |
| 5,066,858 | 11/1991 | Elings et al. . |
| 5,077,473 | 12/1991 | Elings et al. . |
| 5,081,390 | 1/1992 | Elings . |
| 5,103,095 | 4/1992 | Elings et al. . |
| 5,107,113 | 4/1992 | Robinson . |
| 5,107,114 | 4/1992 | Nishioka et al. . |
| 5,117,110 | 5/1992 | Yasutake . |
| 5,120,959 | 6/1992 | Tomita . |
| 5,141,319 | 8/1992 | Kajimura et al. . |
| 5,142,145 | 8/1992 | Yasutake . |
| 5,144,128 | 9/1992 | Hasegawa et al. ............ 250/306 |
| 5,144,833 | 9/1992 | Amer et al. . |
| 5,155,361 | 10/1992 | Lindsay . |
| 5,155,715 | 10/1992 | Ueyema et al. . |
| 5,157,251 | 10/1992 | Albrecht et al. . |
| 5,166,516 | 11/1992 | Kajimura . |
| 5,168,159 | 12/1992 | Yagi . |
| 5,189,906 | 3/1993 | Elings et al. . |
| 5,196,713 | 3/1993 | Marshall . |
| 5,198,715 | 3/1993 | Elings et al. . |
| 5,202,004 | 4/1993 | Kwak et al. . |
| 5,204,531 | 4/1993 | Elings et al. . |
| 5,206,702 | 4/1993 | Kato et al. . |
| 5,210,410 | 5/1993 | Barrett . |
| 5,224,376 | 7/1993 | Elings et al. . |
| 5,229,606 | 7/1993 | Elings et al. . |
| 5,231,286 | 7/1993 | Kajimura et al. . |
| 5,237,859 | 8/1993 | Elings et al. . |
| 5,253,516 | 10/1993 | Elings et al. . |
| 5,257,024 | 10/1993 | West . |
| 5,258,107 | 11/1993 | Yoshida et al. . |
| 5,260,567 | 11/1993 | Kuroda et al. . |
| 5,260,622 | 11/1993 | West . |
| 5,260,824 | 11/1993 | Okada et al. . |
| 5,262,643 | 11/1993 | Hammond et al. . |
| 5,266,801 | 11/1993 | Elings et al. . |
| 5,266,896 | 11/1993 | Rugar et al. . |
| 5,266,897 | 11/1993 | Watanuki et al. . |
| 5,267,471 | 12/1993 | Abraham et al. . |
| 5,274,230 | 12/1993 | Kajimura et al. . |
| 5,276,324 | 1/1994 | Ohtaki et al. . |
| 5,280,341 | 1/1994 | Nonnemacher et al. . |
| 5,283,437 | 2/1994 | Grescher et al. . |
| 5,283,442 | 2/1994 | Martin et al. . |
| 5,286,977 | 2/1994 | Yokoyama et al. . |
| 5,289,004 | 2/1994 | Okada et al. . |
| 5,291,775 | 3/1994 | Gamble et al. . |
| 5,293,042 | 3/1994 | Miyamoto . |
| 5,294,804 | 3/1994 | Kajimura . |
| 5,296,704 | 3/1994 | Mishima et al. . |
| 5,298,748 | 3/1994 | Kenny et al. ............ 250/306 X |
| 5,298,975 | 3/1994 | Khoury et al. . |
| 5,304,924 | 4/1994 | Yamano et al. . |
| 5,306,919 | 4/1994 | Elings et al. . |
| 5,307,693 | 5/1994 | Griffith et al. . |
| 5,308,974 | 5/1994 | Elings et al. . |
| 5,314,254 | 5/1994 | Yashar et al. . |
| 5,314,829 | 5/1994 | Coles . |
| 5,317,153 | 5/1994 | Matshshiro et al. . |
| 5,319,960 | 6/1994 | Gamble et al. . |
| 5,319,977 | 6/1994 | Quate et al. . |
| 5,321,977 | 6/1994 | Clabes et al. . |
| 5,323,003 | 6/1994 | Shido et al. . |
| 5,324,935 | 6/1994 | Yasutake . |
| 5,325,010 | 6/1994 | Besocke et al. . |
| 5,329,808 | 7/1994 | Elings et al. . |
| 5,331,589 | 7/1994 | Gambino et al. . |
| 5,338,932 | 8/1994 | Theodore et al. . |
| 5,354,985 | 10/1994 | Quate . |
| 5,357,105 | 10/1994 | Harp et al. . |
| 5,360,977 | 11/1994 | Masatoshi et al. . |
| 5,381,101 | 1/1995 | Bloom et al. ............ 324/676 |
| 5,383,354 | 1/1995 | Doris et al. ............ 73/105 |
| 5,388,452 | 2/1995 | Harp et al. . |
| 5,438,206 | 8/1995 | Yokoyama et al. . |
| 5,461,907 | 10/1995 | Tench et al. ............ 73/105 |
| 5,468,959 | 11/1995 | Tohda et al. ............ 250/306 |
| 5,469,733 | 11/1995 | Yasue et al. ............ 73/105 |
| 5,481,521 | 1/1996 | Washizawa et al. . |
| 5,495,109 | 2/1996 | Lindsay et al. ............ 250/306 |
| 5,497,000 | 3/1996 | Tao et al. . |
| 5,513,518 | 5/1996 | Lindsay ............ 73/105 |
| 5,581,083 | 12/1996 | Majumdar et al. ............ 73/105 X |
| 5,594,166 | 1/1997 | Itoh et al. ............ 73/105 |
| 5,670,712 | 9/1997 | Cleveland et al. ............ 73/105 |
| 5,753,814 | 5/1998 | Han et al. ............ 73/105 |
| 5,866,805 | 2/1999 | Han et al. ............ 73/105 |
| 5,925,818 | 7/1999 | Cleveland et al. ............ 73/105 |

OTHER PUBLICATIONS

Joyce, Stephen A., et al., "Mechanical Relaxation of Organic Monolayer Films Measured by Force Microscopy", Physical Review Letters, May 4, 1992, vol. 68, No. 18, pp. 2790–2793.

Binnig, G., et al., "Single–tube three–dimensional scanner for scanning tunneling Microscopy", Review of Scientific Instruments, Aug. 1986, vol. 57, No. 8, pp. 1688–1689.

Drake, B., et al., "Imaging Crystals, Polymers, and Processes in Water with the Atomic Force Microscope", Science, vol. 243, pp. 1586–1589.

Sonnenfeld, Richard, et al., "Atomic–Resolution Microscopy in Water", Science, Apr. 11, 1986, vol. 232, pp. 211–213.

Davidsson, P., et al., "A new symmetric scanning tunneling microscope design", Journal of Vacuum Science & Technology: Part A, Mar./Apr. 1988, No. 2, pp. 380–382.

Marti, O., et al., "Atomic force microscopy of liquid–covered surfaces: Atomic resolution images", Applied Physics Letters, Aug. 17, 1987, vol. 51. No. 7, pp. 484–486.

Kirk, M. D., et al., "Low–temperature atomic force microscopy", Review of Scientific Instruments, Jun. 1988, vol. 59, No. 6, pp. 833–835.

Sonnenfeld, Richard, et al., "Semiconductor topography in aqueous environments: Tunneling microscope of chemomechanically polished (001) GaAs", Applied Physics Letters, Jun. 15, 1987, vol. 50, No. 24, pp. 1742–1744.

Chalmers, S. A., et al., "Determination of tilted superlattice structure by atomic force microscopy", Applied Physics Letters, Dec. 11, 1989, vol. 55, No. 24, pp. 2491–2493.

West, Paul, et al., "Chemical applications of scanning tunneling microscopy", IBM Joint Research Development, Sep. 1986, vol. 30, No. 5, pp. 484490.

Kramar, John Adam, "Candicacy Report", May 21, 1985.

Mate, C. Mathew, et al., "Determination of Lubricant Film Thickness on a Particulate Disk Surface by Atomic Force Microscopy", IBM Research Division, Research Report.

Martin, Y., et al., "Atomic force microscope–force mapping and profiling a sub 100–Å scale", Journal of Applied Physics, May 15, 1987, vol. 61, No. 10, pp. 4723–4729.

Damaskin, B.B., et al., "The Adsorption of Organic Molecules", Comprehensive Treatise of Electrochemistry, vol. 1: The Double Layer, pp. 353–395.

Travaglini, G., et al., "Scanning Tunneling Microscopy on a Biological Matter", Surface Science 1987, vol. 181. pp. 380–390.

Ohnesorge, F., et al., "True Atomic Resolution by Atomic Forces Microscopy Through Repulsive and Attractive Forces", Science, Jun. 4, 1993, vol. 260, pp. 1451–1456.

Melmed, Allan J., "The art and science and other aspects of making sharp tips", Journal of Vacuum Science & Technology, Mar./Apr. 1991, vol. B9, No. 2, pp. 601–608.

Musselman, Inga Holl, et al., "Platinum/iridium tips with controlled geometry for scanning tunneling microscopy", Journal of Vacuum Science & Technology, Jul./Aug. 1990, vol. 8, No. 4, pp. 3558–3562.

Ibe, J. P., et al., "On the electrochemical etching of tips for scanning tunneling microscopy", Journal of Vacuum Science & Technology, Jul./Aug. 1990, vol. 8, No. 4, pp. 3570–3575.

Nagahara, L. A., "Preparation and characterization of STM tips for electrochemical studies", Review of Scientific Instruments, Oct. 1989, vol. 60, No. 10, pp. 3128–3130.

Specht, Martin, et al., "Simultaneous mesaurement of tunneling current and force as a function of position through a lipid film on a solid substrate", Surface Science Letters, 1991, vol. 257, pp. L653–L–658.

Brede, M., et al., "Brittle crack propagation in silicon single crystals", Journal of Applied Physics, Jul. 15, 1991, vol. 70, No. 2, pp. 758–771.

Hu, S.M., "Stress–related problems in silicon technology", Journal of Applied Physics, Sep. 15, 1991, vol. 70, No. 6, pp. R53–R80.

Hansma, P. K., et al., Article (untitled) from Journal of Applied Physics, Jul. 15, 1994, vol. 76, No. 2, pp. 796–799.

Mazur, Ursula, et al., "Resonant Tunneling Bands and Electrochemical Reduction Potentials", Journal of Physical Chemistry.

O'Shea, S.J., et al., "Atomic Force microscopy of local compliance at solid–liquid interfaces",.

Putman, Constant A.J., et al., "Visoelasticity of living cells allows high–resolution imaging by tapping mode atomic force microscopy".

Grigg, D.A., et al., "Tip–sample forces in scanning probe microscopy in air and vacuum", Journal of Vacuum Science Technology, Jul./Aug. 1992, vol. 10, No. 4, pp. 680–683.

Lindsay, S.M., et al., "Scanning tunneling microscopy and atomic force microscopy studies of biomaterials at a liquid–solid interface", Journal of Vacuum Science Technology,/ Jul./Aug. 1993, vol. 11. No. 4, pp. 808–815.

Jarvis, S.P., et al., "A novel force microscope and point contact probe", Review of Scientific Instruments, Dec. 1993, vol. 64, No. 12, pp. 3515–3520.

Stewart, A.M., et al., "Use of magnetic forces to control distance in a surface force apparatus".

Marti, O., et al., "Control electronics for atomic force microscopy", Review of Scientific Instruments, Jun. 1988, vol. 59, No. 6, pp. 836–839.

MAGNETIC MODULATION OF FORCE SENSOR FOR AC DETECTION IN AN ATOMIC FORCE MICROSCOPE

CROSS-REFERENCE TO RELATED APPLICATIONS

This application is a continuation of U.S. patent application Ser. No. 08/710,191, filed Sep. 12, 1996, now U.S. Pat. No. 5,866,805, which application is a continuation-in-part of U.S. patent application Ser. No. 08/553,111, filed Nov. 7, 1995, now U.S. Pat. No. 5,612,491, which application in turn was a division of U.S. patent application Ser. No. 08/403,238, filed Mar. 10, 1995, now U.S. Pat. No. 5,513,518, which application in turn was a continuation-in-part of U.S. patent application Ser. No. 08/246,035, filed May 19, 1994, now U.S. Pat. No. 5,515,719. The disclosures of each of the foregoing are hereby incorporated by reference.

STATEMENT AS TO RIGHTS TO INVENTION

The invention described in the great-grandparent patent application was made with Government support under grant N00014-90-J-1455 awarded by the Office of Naval Research and Grant No. DIR-8920053 awarded by the National Science Foundation. The Government may have certain rights in this invention.

BACKGROUND OF THE INVENTION

This invention relates to the use of a magnetic field to apply a time-varying force to a force-sensing cantilever in an atomic force microscope in order to enhance the imaging sensitivity of the microscope through a scheme of synchronous detection of the corresponding modulation in the cantilever deflection signal. The cantilever may be coated with a magnetic material in which case the force may be applied either as a result of the torque induced by a magnetic field on a permanently magnetized cantilever or as the result of the force on a permanent or induced magnetic moment that arises from gradients in the applied field.

BACKGROUND OF THE INVENTION

The atomic force microscope works by scanning a force-sensing probe over a surface and in close proximity to it. Small deflections of the probe are sensed and used to maintain a constant interaction force (i.e., constant height of the probe above the surface). By recording the adjustments needed to maintain the interactions constant, a topographical map of surface features may be made. See, Binnig, G., et al., Atomic Force Microscope, Phys. Rev. Lett. 56(9), pp. 930–933 (1986). An improvement results if the position of the force-sensing probe is modulated (at a frequency, f) and the corresponding ac signal detected. This is because (a) this can result in reduced bandwidth (and hence reduced noise) if synchronous (i.e., lock-in) detection is used and (b) the amplitude of the ac signal is a measure of the derivative of the interaction force versus distance. This quantity changes much more rapidly than the interaction force itself. It is positive in the region where interaction forces are attractive (usually at large distances) and negative where interaction forces are repulsive (at short distances, i.e., in contact). Such a scheme has been described for non-contact AFM operation in air by Martin et al., Atomic force microscope-force mapping and profiling on a sub 100 angstrom scale, J. Appl. Phys. 61(10), pp. 4723–4729 (1987).

It has generally been believed that such operation in fluid would not be possible because of hydrodynamic damping of the cantilever. However, it has been demonstrated that sensitive ac detection of the force gradient is possible in fluids. In one case, this is done by modulating the position of the entire sample cell. See, Hansma, P. K., et al., Tapping mode atomic force microscopy in liquids, Appl. Phys. Lett. 64, pp. 1738–1740 (1994). This scheme is illustrated in FIG. 1. A laser beam 10 is reflected off a force-sensing cantilever 12, deflections of which are detected by a position sensitive detector 14. The cantilever is scanned over the sample surface 16 by a piezoelectric transducer 18. The force-sensing cantilever is immersed in a fluid body 20 contained in a fluid cell 22. The fluid cell 22 is mounted on a second transducer 24 which can displace the fluid cell 22 and sample surface 16 relative to the scanning transducer 18.

An ac signal 26 is applied to the second transducer 24 so as to modulate the gap 28 between the force sensing probe tip 30 on cantilever 12 and the sample surface 16. The corresponding modulation of the laser beam position is detected by the detector 14. A synchronous detector 32 determines the amplitude and phase of the modulation. These signals are used to set the operating point of the microscope. For example, in the repulsive (contact) region of interaction between the atoms on the tip and the atoms on the sample surface, the tip deflection is in phase with the modulation and the amplitude decreased by closer contact with the surface. Thus, the height of the tip is adjusted so as to give a constant, in phase, reduction of the modulation signal as the tip is scanned over the surface. A plot of these adjustments as a function of the position of the tip in the plane of the surface constitutes a topographical height map of the surface taken at constant interaction-force-gradient.

A second group, Putnam, C. A. J., et al., Viscoelasticity of living cells allows high resolution imaging by tapping mode atomic force microscopy (unpublished), have shown that similar results may be obtained by applying the modulation signal to the scanning transducer. This is illustrated in FIG. 2. The components are the same as those shown in FIG. 1, with the exception of the second transducer 24 which is omitted in this case. The gap 28 is modulated directly by a signal 26 applied to the scanning transducer 18.

Both of these approaches suffer from several drawbacks. The frequency of modulation is limited by the low-resonant frequency of the parts that are being displaced. In one case (FIG. 1) this is the entire sample cell. In the other case (FIG. 2) it is the entire scanning assembly. Furthermore, these complex assemblies have many resonances, not all of which cause the tip to be displaced with respect to the surface. Additionally, these schemes make use of piezoelectric transducers which require high voltages for their operation, a requirement that imposes constraints when the microscope is operated in conducting liquids.

An alternative method of modulating the gap has been proposed by Lindsay, U.S. Pat. No. 5,515,719 and others including O'Shea, S. J., et al., Atomic force microscopy of local compliance at solid-liquid interfaces, Chem. Phys. Lett. 223:336–340 (1994). In this approach, a magnetic particle or coating is applied to the force sensing cantilever and an external magnetic field is used to apply a force to the cantilever. This approach works in different ways, depending upon the direction of magnetization of the particle or film. O'Shea, et al. do not describe a method for controlling the direction of the magnetization of the film on the cantilever. Neither do they describe a method for producing force-gradient images by using this technique to modulate the gap between the tip and sample. Lindsay '719 has described a reproducible method for applying a force to a cantilever using an external magnetic field and also a method for forming images by modulating the position of the cantilever with this technique. However, the magnetic arrangement described by Lindsay '719 requires either a large magnetic moment on the tip or a large field gradient.

One approach to applying a magnetic force is illustrated in FIG. 3. FIG. 3 shows the arrangement described in Lindsay '719. A magnetic particle or film 33 is magnetized so that the resulting moment, M (34) lies perpendicular to the soft axis of the cantilever 36. Then a magnetic field gradient 38 is applied in the same direction as M (34). The result is a force that is normal to the soft axis of the cantilever.

Accordingly, the need still exists in this art for an improved method and apparatus for enhancing image sensitivity in an atomic force microscope.

SUMMARY OF THE INVENTION

That need has been met with the scanning force microscope of the present invention. In accordance with one aspect of the invention, a thin film of a magnetic material is applied to one or both surfaces of a force sensing cantilever. The cantilevers are then placed between the poles of an electromagnet and a magnetizing field applied in the direction of the soft axis of the cantilevers. The field is chosen so as to be bigger than the saturation field for the magnetic film. A small electromagnet is placed in the housing of the microscope so as to generate a field normal to the soft axis of the cantilever. The field is generated by an ac voltage and causes a time varying force to be applied to the cantilever. The corresponding modulation of the cantilever position is sensed by reflection of a laser beam into a position sensitive detector. The magnitude and phase of this signal are determined by a synchronous detector. Images of the sample surface are made at constant force gradient by scanning the cantilever over the surface while adjusting the gap between the probe and sample so as to maintain a constant output from the synchronous detector.

The present invention provides a scanning probe microscope for generating a signal corresponding to the surface characteristics of a scanned sample which includes a force sensing probe tip disposed on a first side of a free end of a flexible cantilever and adapted to be brought into close proximity to a sample surface; a magnetized material disposed on a second side opposite the first side of the flexible cantilever; an XY scanner for generating relative scanning movement between the force sensing probe tip and the sample surface; a Z control for adjusting the distance between the force sensing probe tip and the sample surface; and a deflection detector for generating a deflection signal indicative of deflection of the flexible cantilever. The scanning probe microscope also includes an ac signal source and a magnetic field generator for generating a magnetic field, with the magnetic field generator being coupled to the ac signal source so as to modulate the magnetic field with the ac signal. The microscope further includes a synchronous detector having the ac signal as a reference input and the deflection signal as a signal input, with an output of the synchronous detector corresponding to the surface characteristics of the scanned sample.

The microscope of the present invention provides an ac modulation of the gap which is obtained by movement of only the force sensing cantilever so that the modulation may be applied at a high frequency, thus avoiding spurious resonances. The method of modulation which is used is consistent with operation in fluids. Additionally, the force-sensing cantilevers are magnetized with a moment along the soft axis of the cantilever.

The present invention also includes a method for magnetizing a thin film of magnetizable material disposed on a force sensing cantilever, and includes placing the thin film of magnetizable material on the force sensing cantilever; placing the force sensing cantilever between two opposite poles of an electromagnet, and applying current to the electromagnet so as to generate a magnetic field between the opposite poles of the electromagnet while the force sensing cantilever is between the opposite poles. A soft axis of the force sensing cantilever lies along the direction of the magnetic field so that the film, when magnetized, has a magnetic moment parallel to the soft axis.

In preferred embodiments of the invention, a thin film of a magnetic material is applied to one or both surfaces of a force sensing cantilever. The cantilevers are then placed between the poles of an electromagnet and a magnetizing field applied in the direction of the soft axis of the cantilevers. The field is chosen so as to be bigger than the saturation field for the magnetic film. A small electromagnet is placed in the housing of the microscope so as to generate a field normal to the soft axis of the cantilever. The field is generated by an ac voltage and causes a time varying force to be applied to the cantilever. The corresponding modulation of the cantilever position is sensed by reflection of a laser beam into a position sensitive detector. The magnitude and phase of this signal are determined by a synchronous detector. Images of the sample surface are made at constant force gradient by scanning the cantilever over the surface while adjusting the gap between the probe and sample to as to maintain a constant output from the synchronous detector.

Accordingly, it is a feature of the present invention to provide a microscope in which ac modulation of the gap is obtained by movement of only the force sensing cantilever, so that the modulation may be applied at a high frequency, avoiding spurious resonances. It is another feature of the present invention is to use a method of modulation that is consistent with operation in fluids. It is yet another feature of the present invention to produce force-sensing cantilevers that are consistently magnetized with a moment along the soft axis of the cantilever. These and many other features and advantages will become apparent from the following detailed description, the accompanying drawings, and the appended claims.

DETAILED DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
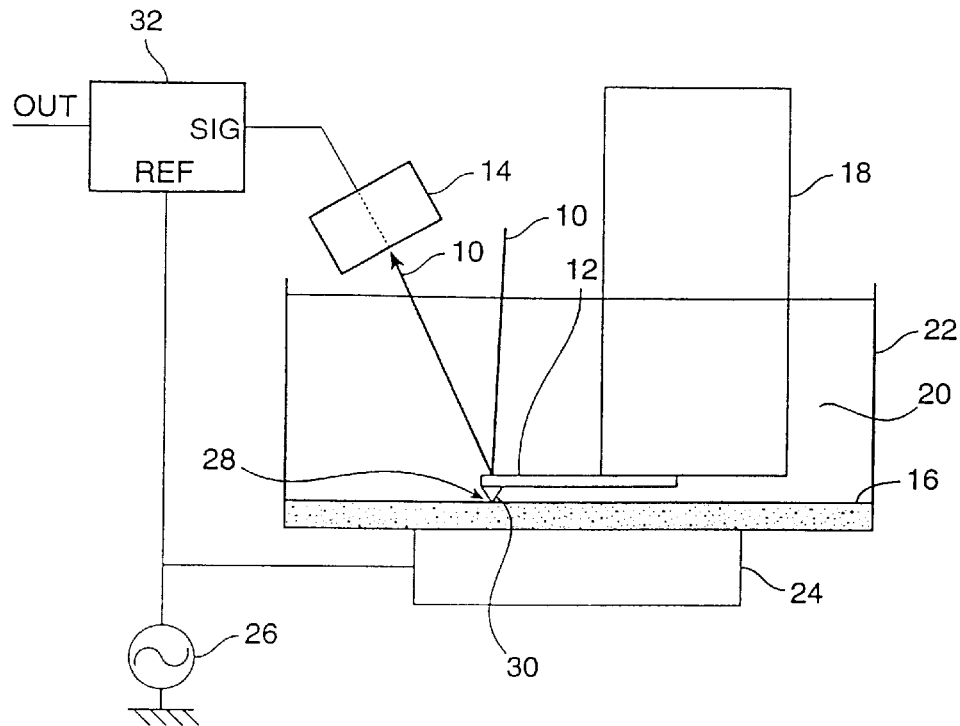
FIG. 1 is a schematic diagram of one prior art scheme for modulating the tip to substrate gap in force microscopy in fluids where the whole sample is moved up and down relative to the probe scanner.
Figure 2:
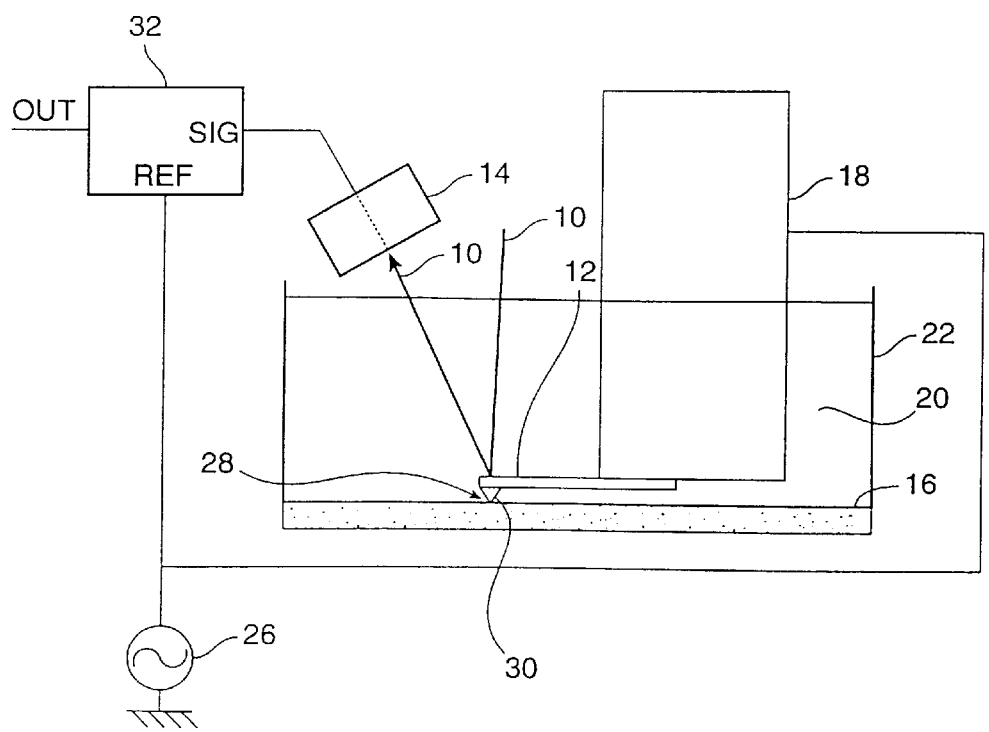
FIG. 2 is a schematic diagram of another prior art scheme where the modulating signal is applied directly to the probe scanner.
Figure 3:
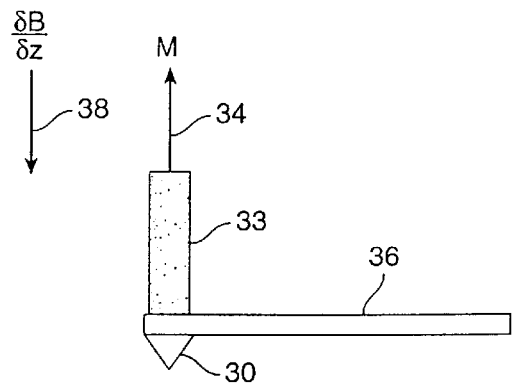
FIG. 3 is a diagram of a prior art scheme for placing a magnetic force on a force-sensing cantilever.
Figure 4:
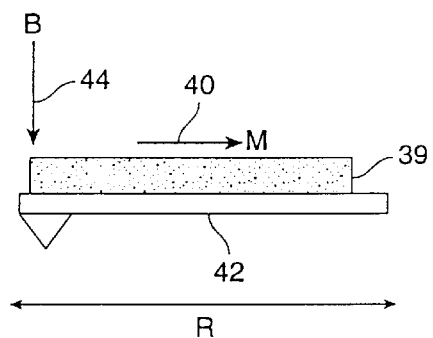
FIG. 4 is a diagram illustrating the arrangement used in the present invention: a field normal to the magnetic moment of the cantilever exerts a torque on the cantilever.

One arrangement in accordance with the invention is shown in FIG. 4. Here, a film or particle 39 attached to the cantilever is magnetized with a moment M (40) along the soft axis of the cantilever 42. A magnetic field B (44) is applied normal to the soft axis of the cantilever. This results in a torque N=M×B. 5 Thus, with a cantilever of length R, a force F of magnitude F=|N|/R is applied to the end of the tip perpendicular to the soft axis of the cantilever. This method is preferred because it is generally easier to obtain a high value of magnetic field than it is to obtain a high value of magnetic field gradient.

Figure 5:
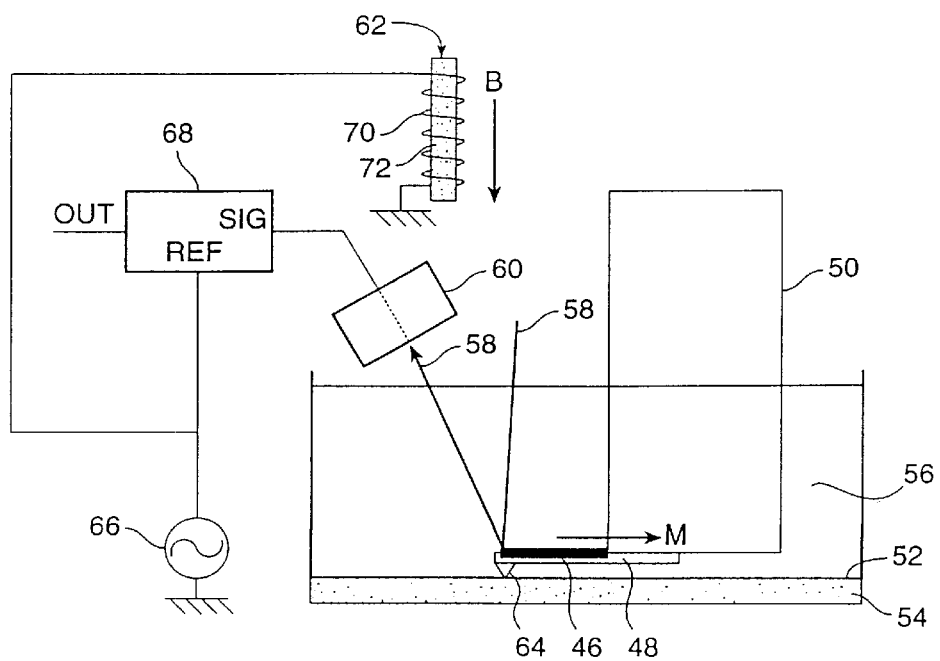
FIG. 5 is a schematic diagram illustrating the overall layout of an ac magnetically modulated force sensing microscope constructed according to a presently preferred embodiment of the present invention.

An overall layout of the scanning force microscope according to a presently preferred embodiment of the present invention is shown in FIG. 5. A thin film or particle of magnetic material 46 is applied to the back of a force-sensing cantilever 48 with the direction of the magnetic moment M along the soft axis of the cantilever 48. The cantilever 48 is attached to a scanning transducer 50 which holds it above the surface 52 of a sample 54 which may be submerged in a fluid body 56. A laser beam 58 is reflected from the back of the cantilever 48 into a position-sensitive detector 60 so that deflections of the cantilever 48 may be detected and recorded. A small solenoid 62 is placed near cantilever 48 so as to generate a magnetic field B that is predominantly perpendicular to the soft axis of cantilever 48. For the purpose of modulating the position of the tip 64 of cantilever 48 with respect to the sample surface 52, an alternating current (ac) voltage source 66 is used to drive the solenoid 62. The corresponding modulation level is detected by a synchronous detector 68 which is also driven with the ac signal 66 as a reference.

The ac signal is preferably a sine wave. It is higher in frequency than the highest frequency associated with scanning a pixel, but generally equal to (or less than) the resonant frequency of the force sensing cantilever (which is typically about 50 kHz). The synchronous detector averages that part of the input signal bearing a constant phase to the reference signal. If the input signal is S(t) and the reference signal (the signal that did the modulation) is A cos(ωt), then the synchronous detector forms the averaged product:

$$\frac{1}{\tau}\int_0^\tau S(t) A \cos(\omega t + \phi) dt$$

where φ is a fixed phase shift (which can be set electronically to cancel systematic unwanted phase shifts or to detect the quadrature component of the signal) and τ is a time constant for integration of the signal. This time constant is set equal to about the time taken to scan one pixel in the final image. In this way, the averaging does not loose resolution. The modulation period (2 π/ω) must be less than the integration time in order for averaging to occur.

In operation, the microscope height (z height) is controlled by a feedback control loop as is well known to those of ordinary skill in the art. The output of the feedback control loop acts to adjust the output of the synchronous detector so that it remains constant while the z height is adjusted to achieve this. The topographical output of the microscope is the map of adjustments to the z height.

Construction of a suitable solenoid and choices of magnetic materials are described in Lindsay, U.S. Pat. No. 5,515,719. The solenoid may made from several hundred turns of pile-wound wire 70 on a core 72 of a magnetic material such as, for example, Permendur core (available from Eagle Alloys of Jefferson City, Tenn.). This produces a field of about 100 Gauss at a distance of about 3 mm from the pole piece when a current of 500 mA is passed through the coil. Other mechanisms and variants for delivering this magnetic field could also be used as would be known to those of ordinary skill in the art.

Figure 6:
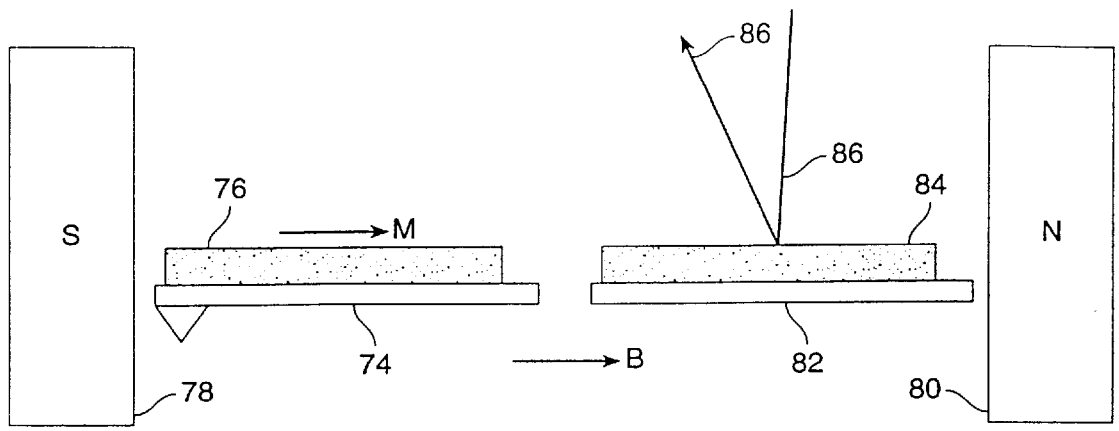
FIG. 6 is a schematic diagram illustrating the scheme used in the present invention for magnetizing the cantilevers and for calibrating the magnetization.

An important step in the preparation of the cantilevers 48 is the formation of a controlled magnetic moment. One method for doing this is to place the cantilever in a strong magnetizing field. According to a presently preferred embodiment of the present invention, a film of cobalt of about 500 angstroms thickness is evaporated onto the cantilever surface. Films of this thickness and composition are relatively easy to magnetize in the plane of the film. The magnetization can be monitored by simultaneous preparation of a film on a test substrate such as a wafer of silicon. This process is illustrated in FIG. 6. The cantilever 74 is coated with a magnetic film 76 and is placed between the pole pieces of an electromagnet 78, 80 with its soft axis lying along the field direction. Magnetization of the thin film 76 can be monitored using a separate test specimen, consisting of a silicon wafer 82 coated with an identical thin magnetic film 84. A laser beam 86 from an ellipsometer (not shown) is used to measure the local magnetization using rotation of the polarization of the incident light 86. The magnetic field is swept as the magnetization of the film is recorded.

Figure 7:
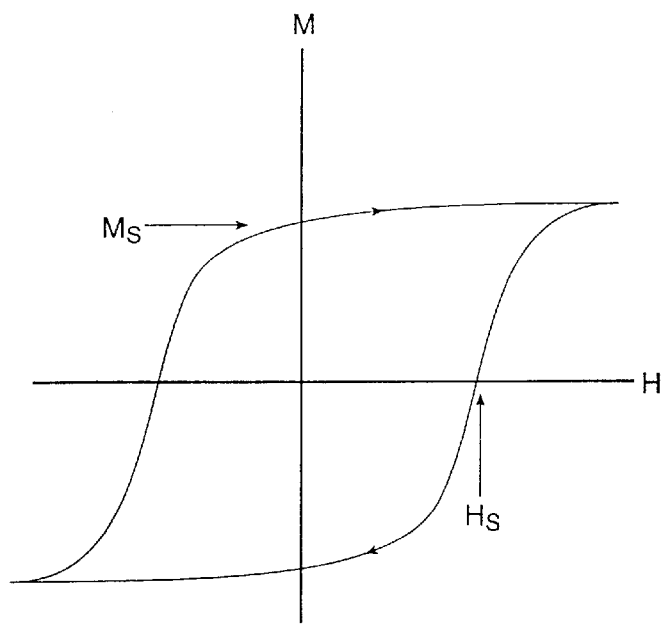
FIG. 7 is a graphical plot illustrating a typical hysteresis loop for a magnetic thin film.

A typical magnetization curve for such a thin film is shown in FIG. 7. It shows the characteristic hysteresis loop due to the permanent magnetization of the sample at a saturation magnetization M, which occurs at a saturating field Hs. A typical value for $M_s$ is 1,400 emu/cm$^3$ and a typical value for $H_s$ is 400 Gauss. A force sensing cantilever has typical dimensions of 100 μm by 100 μm. Covered with a 500 Å thickness of cobalt film, this gives a volume of $5\times10^{-10}$ cm$^3$ of magnetic material. When magnetized to saturation, this yields a moment of $7\times10^{-10}$ emu. In a field of 100 Gauss normal to the magnetic moment, this results in a torque of $7\times10^{-5}$ dyne-cm. Thus, at the end of a 100 μm cantilever, the force is $7\times10^{-3}$ dyne or $7\times10^{-8}$ N. Thus, for a force-sensing cantilever with a spring constant of 0.1 N/m, a reasonable magnetic field can move the tip by up to 100 nm.

Thus, the degree of control is adequate not only for applying modulation to the cantilever (where displacements of 0.01 nm are adequate) but also for controlling instabilities in the cantilever position caused by attractive forces which pull the cantilever into the surface as described more fully in U.S. Pat. No. 5,515,719.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A scanning probe microscope for generating a signal corresponding to the surface characteristics of a scanned sample comprising:

a force sensing probe tip disposed on a first side of a free end of a flexible cantilever and adapted to be brought into close proximity to a sample surface; a magnetized material disposed on a second side opposite said first side of said flexible cantilever; an XY scanner for generating relative scanning movement between said force sensing probe tip and said sample surface; a Z control for adjusting the distance between said force sensing probe tip and said sample surface; a deflection detector for generating a deflection signal indicative of deflection of said flexible cantilever; an ac signal source; a magnetic field generator for generating a magnetic field, said magnetic field generator being coupled to said ac signal source so as to modulate said magnetic field with said ac signal; and a synchronous detector having said ac signal as a reference input and said deflection signal as a signal input, an output of said synchronous detector corresponding to the surface characteristics of the scanned sample; said magnetized material having a magnetic moment parallel to the soft axis of said flexible cantilever.

2. A scanning probe microscope as claimed in claim 1 wherein said magnetic field generator includes a solenoid.

3. A scanning probe microscope as claimed in claim 1 wherein said flexible cantilever, said force sensing probe tip, and said sample surface are all submerged in a fluid.

4. A scanning probe microscope as claimed in claim 3 wherein said fluid is a liquid.

5. A scanning probe microscope as claimed in claim 4 wherein said fluid is water.

6. A microscope for determining the characteristics of a sample, said microscope comprising:

a force sensing probe tip disposed on a first side of a free end of a flexible cantilever; a magnetic material disposed on a second side of said free end of said cantilever, said second side being opposite said first side; a detector for detecting bending of said cantilever and producing a deflection signal in response thereto; a transducer for scanning said force sensing probe tip relative to the surface of the sample; an ac signal source; a device for generating a magnetic field, said device being responsive to said ac signal source for causing ac modulation of said magnetic field; and a synchronous detector responsive to said deflection signal and said ac signal for generating an output signal corresponding to surface characteristics of the scanned sample; said magnetic field being directed in use toward said second side of said free end of said cantilever, and said magnetic material having a magnetic moment parallel to the soft axis of said flexible cantilever.

7. A microscope as claimed in claim 6 wherein said force sensing probe tip and said surface of the sample are all submerged in a fluid.

8. A microscope as claimed in claim 7 wherein said fluid is a liquid.

9. A microscope as claimed in claim 8 wherein said fluid is water.

* * * * *